United States Patent Office 3,267,042
Patented August 16, 1966

3,267,042
NOVEL COMPOSITIONS AND THEIR USE IN PREVENTING AND INHIBITING FOAM
Elemer Demba, Chicago, Ill., assignor to Nalco Chemical Company, Chicago, Ill., a corporation of Delaware
No Drawing. Filed Aug. 5, 1963, Ser. No. 300,061
8 Claims. (Cl. 252—321)

This invention is concerned with new compositions and their use in inhibiting and preventing foaming problems. More particularly, the instant invention relates to modified silica compositions, particularly valuable in inhibiting and preventing foaming of aqueous industrial processes.

It is known that many industrial systems are particularly susceptible to foaming problems even under mild conditions of agitation. In their more serious aspects these problems become a substantial drawback in not allowing full utilization of the particular equipment involved. Also in many instances operating conditions are so altered by foam that considerable interference with the process itself is caused, with resultant low capacity and considerable economic loss. Serious foaming sometimes occurs, for example, when solvents or unreacted starting materials are stripped off either in vacuo or under atmospheric conditions, leaving behind the desired industrial product. For example, foaming of a considerable magnitude occurs when organic solvents used in preparing aqueous latex emulsions and/or unreacted monomer are removed by heat distillation, vacuum flashing, steam stripping or through other concentration techniques.

In order to counteract foaming problems of the type discussed above and others, it is oftentimes necessary to resort to chemical treatment to both abate the existing foam and prevent its reoccurrence. However, many of the chemical treatments are limited in their application insofar as only one of the aforementioned effects takes place. That is, either immediate foam abatement occurs without continuing foam prevention, or a treatment will provide continuous foam protection but is of no great use in dissipating already formed foam. Therefore, in many instances it is necessary to resort to at least two or more specific chemicals acting as adminicles to one another in order to achieve both foam abatement and foam inhibition in a system under treatment. However, this resort to multi-component treatment in order to achieve the required scope of activity often leads to further problems such as dispersibility of the compounds both in each other and in the particular system to be controlled. In addition, costly time and manpower must be spent in compounding these multi-component antifoam treating compositions.

Another serious disadvantage of prior art compositions is their inability to be applied generally in a wide variety of industrial systems and processes. For example, organo-silicone condensation products or organopolysiloxanes such as silicone and silicate polymers, while possessing foam depressant or antifoam activity in certain media are relatively inactive in other environments. Also, the above compositions and particularly silicones are costly, and often economics dictate use of certain other substances.

Many other disadvantages are involved in the use of prior art antifoam treatments. Some of the substances break down chemically and physically. These products of degradation may debilitate the parent active component or cause foaming problems due to their own foam encouraging properties.

Other antifoam compositions cannot be employed in certain areas due to the fact that they are quickly adduced from the area which needs control such as by heat distillation, or have little or no dispersibility, much less permanent dispersibility in the medium to be treated.

Lastly, many defoaming or foam-inhibiting substances must be employed in relatively large amounts to give effective control, or else cause difficult process control problems because they are ineffective unless added in certain critical amounts.

It would be, therefore, a beneficial advance in the antifoaming art if a single substance could be found which is relatively general in its application, has good chemical and physical stability, excellent dispersibility or solubility in the environment to be treated, and yet need only be applied in relatively low amounts to give effective control. It would be an extreme advantage to the art if an antifoam substance could be discovered which may be usefully employed, particularly in troublesome aqueous systems which have a strong tendency to foam, such as aqueous latex emulsions and in various systems used in processing paper pulp and the like.

It therefore becomes an object of the invention to provide stable, easily-dispersible antifoam compounds which have rather general application without recourse to other antifoam aids.

Another object of the invention is to provide novel compositions of matter which may be used to simultaneously defoam and inhibit foam in widely variable processes.

A specific object of the invention is to provide siliceous type compounds which may be used in aqueous systems particularly susceptible to foaming problems such as aqueous latex emulsions, paper pulp streams, etc.

In accordance with the invention, a novel class of siliceous compounds have been discovered which are admirably suited for use in defoaming and foam inhibition activities. These new compounds may be used as antifoam agents without resort to combination with other ingredients and may be used in a wide variety of industrial processes which are accompanied by foaming problems. In general, these siliceous antifoamers are products derived from the reaction of a silica organosol and a polyethyl silicate. These silica-silicate reaction products find use both as defoaming agents, that is, in abating a system already in a foaming state or in inhibiting or preventing foam formation before such a condition occurs. Both roles may of course be performed simultaneously.

The silica organosol material used as one of the reactants is well-known and needs little elaboration. Such materials and their mode of preparation are discussed in U.S. Patents 2,433,776, 2,433,777, 2,433,778, 2,433,779 and 2,433,780. In newer preparative techniques the starting organo silica sol reactants of the invention are prepared by replacing the water phase of aqueous colloidal silica sols with hydrophilic organic solvents. The precursor aqueous silica sols contain silica particles colloidally dispersed in water. These particles are discrete, dense individual units of silica and have an average particle diameter not greater than 150 millimicrons, and preferably between 5 and 150 millimicrons. When the particle sizes of the silica sols are within the ranges specified the silica particles present in the starting aqueous sols will have surface areas of at least 20 m.$^2$/gram and more often between 100 m.$^2$/gram and 600 m.$^2$/gram.

Preferred aqueous silica sols may be conveniently prepared by utilizing the process of Bird, U.S. 2,244,325. This patent teaches the treatment of dilute alkali metal silicate solutions with cation exchange resins in the hydrogen form to remove substantially all the alkali metal from the silicate. The products produced by the Bird ion exchange method are most frequently dilute, e.g., 1–4% by weight solutions of colloidal silica. Since silica sols of this type are too dilute to be economically utilized it is expedient that they be concentrated to a point whereby the silica concentration is between about 5% and 60% by weight of silica expressed as $SiO_2$. Several methods have been described for conveniently concentrating silica sols of the type produced by Bird, U.S. 2,244,325. Particular reference may be made to U.S. Patents 2,574,902, 2,601,235, 2,680,721 and 2,929,790. By using the teaching of these patents, which effectively employ constant volume evaporation techniques, it is possible to produce aqueous colloidal silica sols which have silica concentrations which preferably range between 5% and 60% and most preferably between 20% and 40% by weight.

When producing aqueous silica sols of the type described, for instance, in Bechtold et al., U.S. 2,574,902, it is preferred to stabilize the sols by adjusting the silica to alkali metal ratio expressed as $SiO_2:Na_2O$, so that it is at most 130:1 and more preferably in the range from 70:1 to 100:1. The alkali metal containing sols are not entirely compatible with organic systems due to the fact that the salt itself causes gelation or precipitation of the silica particles. This "salting-out" effect cannot be prevented even by the use of certain protective agents in replacing the continuous water-phase of an aqueous silica sol with an organic liquid. To prevent this, it is therefore a better practice that these cations be first removed from the surface of the colloidally dispersed silica particles prior to formation of organo sols. This may be readily accomplished by treating typical silica sols of the type described in Bechtold et al. U.S. Patent 2,574,902, with a cation exchange resin in the hydroxide form. This treatment tends to produce a finished sol which I prefer to call "salt-free." The particles of silica in such a sol are also considered as being "salt-free."

Typical commercially available silica sols which may be first deionized as described above to give preferred starting materials that may be subsequently modified to produce salt-free organo sols are those aqueous silica sols which are sold under the trademark "Nalcoag." Typical physical and chemical properties of these types of sols, prior to deionization are set forth below:

TABLE I

|  | Sol I | Sol II | Sol III |
| --- | --- | --- | --- |
| Percent colloidal silica as $SiO_2$ | 30 | 35–36 | 49–50 |
| pH | 10.2 | 8.6 | 9.0±0.1 |
| Viscosity at 77° F., cps | <5 | <5 | 20–30 |
| Average particle diameter, millimicrons | 11–16 | 11–22 | 20–25 |
| Specific gravity at 68° F | 1.205 | 1.255 | 1.385 |
| Average surface area, m.² per gram of $SiO_2$ | 190–270 | 135–190 | 120–150 |
| Density/gallon at 68° F | 10.0 | 10.5 | 11.6 |
| Freezing Point, ° F | 32 | 32 | 32 |
| $Na_2O$, Percent | 0.40 | 0.10 | 0.30 |

To illustrate deionization of the above type sols, the following is presented by way of example.

*Example I*

A silica sol corresponding to Sol No. II was decationized by passing the sol through a column of cation resin in the hydrogen form. The resin was Nalcite HCR which is described in U.S. Patent 2,366,007. Following this treatment, the silica sol was passed through a strong base anion exchange resin in the hydroxide form. In this instance, the resin was a commercially available product known as "Nalcite SBR," which is described in U.S. Patent 2,591,573.

It is estimated that the treated sol will have an approximate shelf life of three years at 75° F. Sols deionized in accordance with the above technique will have a pH within a range of 2.7 to 4.0, a specific conductivity of between 100 and 500 micromhos/cm. and when the silica concentration is between 5 and 60% by weight, their viscosities will range between 1 and 20 cps.

A comparison of the stability of the treated (deionized) sol and the stability of an identical sol that had not been deionized, when adjusted to various pH values with $H_2SO_4$ or NaOH, is set forth in the following table:

TABLE II

| Untreated Sol | pH | Stability | | Treated Sol | pH | Stability | |
| --- | --- | --- | --- | --- | --- | --- | --- |
| | | 75° F. | 120° F. | | | 75° F. | 120° F. |
| 1 | 1.0 | 1 month | | 1 | 1.0 | 2 months | |
| 2 | 2.0 | do | 3 days | 2 | 2.0 | 5 months | 17 days. |
| 3 | 5.0 | 18 hours | | 3 | 5.0 | 5 months | |
| 4 | 6.0 | do | | 4 | 6.0 | 72 days | |
| 5 | 7.0 | 1 month | 2 days | 5 | 7.0 | No viscosity increase after 5 months. | |

As is apparent from the above table the treated sol is stable under acid and neutral conditions, whereas the untreated sol is highly unstable under such conditions.

An important advantage derived by the use of a strong base anion exchanger in the hydrogen form in the deionization procedure described above is that the finished products are substantially free of $CO_2$ and low molecular weight species of silicic acid. These deionized sols are extremely stable, thereby allowing them to be prepared and stored well in advance of the subsequent processes to which they are subjected in the steps of the invention. They have a salt content expressed as $Na_2SO_4$, of less than 0.01%.

The above type silica sols and more preferably "salt-free" silica sols are then treated with various hydrophilic organic solvents which are employed to replace the water phase of the starting aqueous silica sols. Preferred organic solvents which subsequently become the continuous phase of the organo sols are water-miscible alcohols and more preferably primary monohydric alcohols such as methanol, ethanol, propanol, isopropyl alcohol, t-butanol, etc. The most preferred alcohols are the well-known "Cellosolve" alcohols. Examples of "Cellosolve" type alcohols are 2-methoxyethanol, 2-ethoxyethanol, 2-propoxyethanol and 2-butoxyanol. These latter compounds are better known as methyl-"Collosolve," ethyl-"Cellosolve," propyl-"Cellosolve," and butyl-"Cellosolve." They may be generically classified as glycol ethers. Of these the most preferred is 2-ethoxyethanol.

The organo sols may be prepared by adding organic solvent to the aqueous silica sol and distilling off the aqueous phase, leaving behind at termination of the distillation, a substantially organic continuous phase. The distillation is more preferably carried out in vacuo so that substantially all the water from the system is removed at relatively low temperature. Excesses of organic solvent are usually added periodically or in a continuous flow until all the water has been replaced.

The organo sol reactants of the invention are therefore non-aqueous silica sols composed of a hydrophilic organic solvent and preferably a water-miscible alcohol as a continuous phase and colloidal, amorphous, dense spherical particles of silica as the dispersed phase. Preferred silica particles are essentially salt-free whereby excellent compatibility with the organic solvent is achieved. The particle diameter of the silica particles in the organo sol generally vary from 5 to about 150 millimicrons. The specific surface area of the colloidal silica particles is at least 20 m.²/g., and generally in excess of 100 m.²/g. Preferred starting organo sols contain from about 5 to about 60% by weight of the above described silica particles colloidally dispersed in the organic phase. More preferred organo sols contain from about 20% by weight of silica expressed as $SiO_2$ to about 40% by weight.

A typical organo sol which may be used as a reactant is one containing approximately 35% of silica colloidally dispersed in ethyl-"Cellosolve" (2-ethoxyethanol). The silica particles have a specific surface area of 140 m.²/g., and a particle diameter range of 15–40 millimicrons. The silica particles are salt-free, since the sol is derived from a deionized aqueous silica sol.

The other reactant used in forming the antifoam compositions of the invention is a polyethyl silicate. Preferred materials are those having an average molecular weight ranging from 300 to 2000 and more preferably from 400 to 1500. These poly-silicate materials are generally derived from controlled hydrolysis of silicon tetrahalides and particularly silicon tetrachloride in aqueous-ethanolic solutions. A mixture of polymeric materials is formed, but the predominant species has the following general formula:

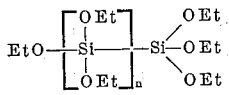

wherein $n$ is an integer ranging from about 4 to about 15 and $Et$ represents the $C_2H_5$ group. In addition other lower molecular weight polysiloxanes may be present which may be termed, for convenience, hydrolyzate condensation products of the starting silicon tetrahalide reactants. These hydrolyzate condensation products generally contain terminal hydroxyl groups. More preferred polyethyl silicate mixtures therefore have at least 1% of their weight composed of free reactive hydroxyl groups and most preferably at least 2%. A typical ethyl silicate polymer has 2–3% of its molecular weight composed of hydroxyls. These reactive hydroxyl containing compounds are believed to act as "bridge" reactants between the surface silanol groups of the silica particles contained in the starting organosol materials and the polyethyl silicate compositions represented by the above formula. In effect, these low molecular weight polysiloxanes which contain reactive hydroxyl groups promote the surface modification or ligation of the colloidal silica particles with the polyethyl silicate polymers.

Likewise, these above polysilicate materials may be defined solely in terms of their available silica content expressed as $SiO_2$. In materials of this type, as the extent of polymerization increases, silica content, expressed as $SiO_2$ likewise proportionally increases. Preferred polyethyl silicates have an available silica content, expressed as $SiO_2$, ranging from 35% by weight of the overall molecule weight to about 55% by weight. More preferred materials have $SiO_2$ contents within a range of 35–45%.

Most preferably, the $SiO_2$ content of the polyethyl silicate reactant ranges from about 38% to about 42% by weight. As a comparison a pure monomeric tetraortho silicate ester has a silica content ($SiO_2$) of approximately 28% by weight. Thus, by the term "polyethyl silicate" is meant a composition mixture characterized by the above distinguishing physical and chemical properties which is usually formed by controlled ethanolic hydrolysis of silicon tetrahalide or similar monomeric derivatives.

A preferred starting polyethyl silicate reactant which has been found to be extremely valuable in preparing antifoam compositions of the invention is sold under the trademark "Ethyl Silicate 40." This compound is a mixture of ethylpolysilicate having about 40% available silica expressed as $SiO_2$ and is synthesized from the controlled hydrolysis of tetraethylortho silicate or tetrachlorosilicon. This polyethyl silicate is generally described as a mixed polymer of ethyl silicate with an average of 5 silicon atoms per molecule.

One specific source of this material has a specific gravity at 20° C. of 1.0558, a freezing point of −90° C., a viscosity at 20° C. of 3.9 cps. and a refractive index at 20° C. of 1.3965. This particular polymeric substance was derived from the controlled hydrolysis of silicon tetrachloride in 95% ethanol and 5% water.

The antifoam compositions of the invention are prepared by heating the above described organo silica sol and polyethyl silicate reactants together at temperatures preferably from about 120° C. to about 250° C. The time of heating may be varied over a wide range, but preferably is carried out in from about 2 to about 12 hours. The most preferred products are prepared by heating from 5 to about 10 hours. Vacuum may also be employed during the heating step to measured levels as low as 5 mm. of mercury. Excellent products have been prepared by heating the two reactants at pot temperatures ranging from 100 to 250° C. over a period of 2–8 hours under reduced pressures ranging from 10 to 50 mm. of mercury.

The exact molecular structures of the final reaction products cannot be set forth due to the complexity and variable makeup of the polyethyl silicate starting material. It is believed that both surface reaction on the silica particles of the organo sol occurs as well as further polymerization of the polyethyl silicate at the relatively high temperature of reaction. Particularly, as mentioned above, the lower molecular weight silicate polymers having free reactive hydroxyl groups help to induce molecule reactivity and particularly reaction between the surface silanol groups of the silica particles and the silicon atoms of the polyethyl silicate molecules to which ethoxy groups are attached. During the reaction itself, ethanol and the hydrophilic organic phase of the starting organo silica sol are removed along with low boiling polyethylsilicate fractions. The final product then is a 100% active slightly viscous liquid free of inactive recrement or diluents, which may be directly employed as a antifoam in various industrial processes. It is believed that in addition to surface modified silica particles there are also present cyclic and linear high molecular weight polyethyl silicates. The reaction products are organophilic but not hydrophobic since they may be wetted with water. Infrared spectral analysis shows almost complete absence of free hydroxyl groups in contradistinction to like analysis of starting polyethyl silicate reactants which preferably contain hydroxyl groups in amounts stated above. Likewise, the reaction products contain Si—O—C type bonding and no direct carbon bonding to silicon atoms was found by spectral analysis.

Preferred reaction products are those in which the beginning reaction mass comprises from about 0.1 to about 50% by weight of the silica organo sol and from about 50 to about 99% by weight of the polyethyl silicate reactant. More preferred reaction masses are composed of 10–40% by weight of silica organo sol and 60–90% by weight of the pre-polymerized polyethyl silicate. Reaction products formed by heating the reactants much above 300° C. form extremely viscous or gelled material of an exceptionally high molecular weight which are generally of little or no use as antifoam compositions.

The following example states a typical mode of preparation of a typical antifoam composition of the invention.

*Example II*

A reactor was charged with 464 lbs. of "Ethyl Silicate 40" and 136 lbs. of a salt-free organo sol containing 34% silica colloidally dispersed in 2-ethoxyethanol. The silica itself was salt-free, had an average particle diameter of 20–50 millimicrons and a specific surface area of 140 m.²/gram. This organo sol had been previously prepared by replacement of the water phase of salt-free aqueous silica sol with ethyl "Cellosolve." Prior to introduction into the reactor, the organo sol was filtered through a sock type cartridge filter. The pot temperature was raised slowly to a maximum of 210° C. over 6–7 hours. The vapors were passed through a packed column and condensate was refluxed back to the column at a rate which did not allow the column head temperature to exceed 120° C. The distillate was composed primarily of ethanol, "Cellosolve," low boiling silicate fragments and water traces. After distillation had ceased the batch was cooled to approximately 150° C. and vacuum applied slowly (100–200 mm. Hg). Distillate was then collected until approximately 25% of the original charge weight was removed. This was accomplished by slowly increasing the pot temperature to a maximum of 185° C. and increasing the vacuum gradually until the required pounds of distillate were collected. In this specific run this was accomplished by collecting distillate at a pot temperature of 185° C., at a column head temperature of 120° C., and under a vacuum of 70–80 mm. of Hg. The product was then cooled and drummed. Excellent antifoam activity was noted with direct use of this product without further incorporation into solvents or modification of any type.

As mentioned above, when the reaction products of the invention are used as foam inhibitors and foam preventers, they may be used as such without any further compounding or modification. If desired, however, the reaction products may be dispersed in aliphatic hydrocarbon oils such as mineral seal oil, kerosene, various light aliphatic fuel oils, gas oils, paraffin waxes, and the like.

In many instances emulsifying agents, such as polyoxyethylene glycols and polyalkylene glycols as those marketed under the trade names of "Ucon" and "Carbowax," may be added to the reaction products of the invention or to their formulations in aliphatic hydrocarbon oil extenders. Compounds other than emulsifiers and extenders, such as dispersants and the like, may also be added to the reaction products of the invention in order to obtain formulated products of the desired physical characteristics in order to overcome feeding problems, etc.

The organo sol-polyethyl silicate reaction products are useful in a wide variety of industrial processes which require control of foaming problems. Among these processes, the compositions may be used in the following: the feedwater of boilers such as wayside boilers; for use in non-frothing emulsions used in leather tanning, the textile industry, etc.; in cutting oils; for incorporation into dye baths, dye pastes, discharge pastes and the like; to prevent foaming and resultant loss of liquid from a circulating cooling system; in fermentation processes; in cooking with fats and oils; in lubricants; and in single or multiple-effect concentrators containing aqueous, organic or inorganic type materials and the like.

Besides use in the above varied processes involving a wide scope of environmental conditions, the compositions of the invention are also active in controlling foaming of latex emulsions used for paints or coatings and in inhibiting and controlling foam in pulp and paper manufacture such as in a kraft process. The compositions have found particular use in inhibiting foam normally occurring during preparation and concentration of rubber latexes via rubber latex emulsion polymerization of such monomers as styrene, acrylonitrile, butadiene, isobutylene, isoprene, chloroprene and mixtures of any of the above. Soaps and surfactants used in the polymerization step cause severe foaming difficulties in absence of use of the defoaming and antifoam additives of the invention. Paper coatings such as butyl latex or polyvinyl chloride latex may likewise be treated during their production, with the instant antifoamers.

When used to control and inhibit foam in industrial areas, addition of as little as 1 p.p.m. of the compositions of the invention gives good foam inhibition and foam prevention. As much as 500 p.p.m. of antifoam may be used with a preferred range being between 1 and 100 p.p.m., and with the most preferred range being 1–25 p.p.m.

The compounds of the invention are effective over a wide range of pH conditions and under almost any combination of pressure and temperature conditions. The compositions when used as antifoam agents should preferably be added as close as possible to the source of the foam. For example, to inhibit foam created under conditions of distilling off unreacted monomer and/or solvents used during production of aqueous latex emulsions, as the type used in the paint and coating industries, the antifoam composition should be added directly to the reaction mass being processed, whereby it is actually present during the concentration step. Likewise, in a papermaking operation, since foaming difficulties occur in the screen boxes and the cylinders of a cylindrical papermaking machine or in the headbox of a Fourdrinier papermaking machine, it is preferred that antifoam application be made there. The antifoam compounds of the invention may also be added to the feed box or to the screen pump, screens, or showers of the cylinder machine, or to the fan pump, showers or wire pit of the Fourdrinier machine. When used for antifoam control in pulp and paper manufacture, as little as ¼ lb. of active antifoam per ton of pulp based on the weight of the dry fiber gives good results. As high as 20 lbs./ton may be used in extremely difficult foaming areas. In a preferred practice, between ¼ and 2 pounds of chemical are used per ton of fiber stock.

EVALUATION OF THE INVENTION

In order to determine the effectiveness of the antifoam compositions of the invention, and particularly their versatility in inhibiting and controlling foam under a wide variety of environmental conditions, various laboratory procedures were devised to simulate industrial conditions and test the efficiency of the reaction products of the invention.

The first test, known as a "Recirculation Test," was devised in order to determine the antifoam activity of the compositions of the invention with respect to paper pulp stock. A test stock was first prepared as follows: to 860 ml. of water containing 224 mg. calcium chloride, were added 140 grams of 16% total solids black liquor and 50 mls. of a 1% aqueous solution of a sodium salt of a rosin acid. 58 mls. of this solution were then added to a 1 gallon jug. 18 grams of kraft pulp were pulped in 1,000 mls. of water and added to the jug containing the black liquor mixture. Stock was then made up to 1 gallon with tap water, well shaken and employed for the following test. In this test, 6 liters of the above paper stock containing pulp were placed in a glass pipe, 6" in diameter and 18" in height. The stock was recirculated through a 1½" diameter hose by means of a pump which was running at 3,450 r.p.m. The amount of antifoam necessary to prevent foam buildup during recirculation was then determined.

The composition of Example II was then tested for antifoam activity in the above discussed recirculation test. This product had excellent activity in preventing and inhibiting foam buildup and in deaerating the paper stock within the aforementioned limits of chemical application per ton of paper stock. Reaction products of the invention using organo sols and polyethyl silicates other than the specific reactants shown in Example II were also tested and gave equally good results.

Another test was performed in order to determine antifoam activity of the compositions of the invention with respect to latex paints. To a half-pint paint can was added 100 ml. of aqueous latex emulsion and 1 p.p.m. of the antifoam of Example II. The can was sealed and mounted in a shaker for 3 minutes. The contents were then poured into a weight per gallon cup and weighed to determine the weight loss due to aeration. A blank was also run, that is, the above test run in absence of antifoam. The sample in which the antifoam was present showed little loss of weight due to aeration, while the unprotected or blank sample showed weight losses as high as 100% due to foam formation. The above demonstrates the excellent activity of the antifoam compositions of the invention in preventing foaming problems of aqueous latex emulsion systems.

The antifoamers of the invention were also tested on acrylic emulsions and butyl rubber latex emulsions. These emulsions were used as test media in the above discussed recirculation test in replacement of paper pulp test stock. Excellent foam inhibition was noted in employment of antifoam in amounts from 1 p.p.m. to 100 p.p.m. based on the weight of the latex. In fact, the reaction products of the invention exhibited a considerably higher degree of antifoam activity than did commercially available silicones which were also similarly tested.

Another test was devised to determine antifoam activity of the compositions of the invention in agitated proteins. A protein test solution was prepared as follows: A de-oiled flaked soya protein (200 g.) was treated for one hour with 3.8 g. of sodium hydroxide in 3.8 liters of Chicago tap water at 104° F. The solution was filtered through an 80 mesh screen and the filtrate used for the following experiment. This was performed by placing 150 ml. of the freshly prepared protein stock in an "Osterizer" jar. The stock was beaten for 5 seconds until a thick, high foam was generated.

The antifoam was then added and blended in the stock for 20 seconds. The time for the surface to clear was then measured. Using varying amounts of the reaction product of Example II, the surface of the stock was cleared in from approximately ½ to 20 seconds. No stock precipitation was noted and the stock itself remained clear.

Various other media were also employed in the just described test. These included mixtures of hydrocarbon fluids and slurries of intermediate products from the mining industry. The antifoam compositions of the invention were evaluated in these synthetically prepared liquids under the above conditions of extreme agitation, and exhibited excellent antifoam inhibition.

The invention, of course, is not limited by the above examples of antifoam use which are meant to be merely illustrative of the type of media which may be foam controlled by the claimed compositions.

The invention is hereby claimed as follows:

1. A new composition of matter useful in defoaming and inhibiting foam formation consisting essentially of the reaction product of a silica organo sol and a polyethyl silicate, said reaction product being formed by heating together 0.1–50% by weight of said sol and 50–99% by weight of a polyethyl silicate having a molecular weight of at least 300 at a temperature less than 300° C.

2. The composition of claim 1 wherein said silica organo sol reactant comprises 5–60% by weight of silica colloidally dispersed in an alcohol, and said polyethyl siliacte contains at least 35% by weight of available silica expressed as $SiO_2$.

3. The composition of claim 1 wherein said polyethyl silicate contains at least 1% by weight of free reactive hydroxyl groups.

4. The process of defoaming and inhibiting foam formation in a system which normally tends to be foamable, which comprises the step of adding to such system in an amount sufficient to control said foam, the reaction product of a silica organo sol and a polyethyl silicate, said reaction product being formed by heating together 0.1–50% by weight of said sol and 50–99% by weight of a polyethyl silicate having a molecular weight of at least 300 at a temperature less than 300° C.

5. The process of claim 4 wherein said silica organo sol reactant contains 5–60% by weight of silica colloidally dispersed in an alcohol, and said polyethyl silicate contains at least 35% by weight of available silica expressed as $SiO_2$.

6. The process of claim 4 wherein said polyethyl silicate contains at least 1% by weight of free reactive hydroxyl groups.

7. The process of claim 4 wherein said reaction product is added to said system in an amount of at least 1 p.p.m.

8. The process of defoaming and inhibiting foam formation in an aqueous system which normally tends to be foamable, which comprises the step of adding to such system at least 1 p.p.m. of an antifoam composition which comprises the reaction product of 0.1–50% by weight of a silica organo sol containing 5–60% of colloidally dispersed silica and 50–99% by weight of a polyethyl silicate containing at least 35% by weight of available silica expressed as $SiO_2$, with at least 2% of the weight of said polyethyl silicate being constituted of free reactive hydroxyl groups, said reaction product being formed by heating together said sol and a polyethyl silicate having a molecular weight of at least 300 at a temperature less than 300° C.

References Cited by the Examiner

UNITED STATES PATENTS

| | | | |
|---|---|---|---|
| 2,416,503 | 2/1947 | Trautman et al. | 252—321 |
| 2,433,777 | 12/1947 | Marshall | 252—309 |
| 2,702,793 | 2/1955 | Smith | 252—321 X |
| 2,974,105 | 3/1961 | Iler | 252—309 |
| 3,076,768 | 2/1063 | Boylan | 252—358 |

ALBERT T. MEYERS, *Primary Examiner.*

JULIUS GREENWALD, *Examiner.*

H. B. GUYNN, *Assistant Examiner.*